(12) United States Patent
Mashanovitch et al.

(10) Patent No.: US 9,344,196 B1
(45) Date of Patent: May 17, 2016

(54) INTEGRATED INTERFEROMETRIC OPTICAL TRANSMITTER

(71) Applicant: Freedom Photonics, LLC, Santa Barbara, CA (US)

(72) Inventors: Milan L. Mashanovitch, Santa Barbara, CA (US); Leif Johansson, Goleta, CA (US)

(73) Assignee: Freedom Photonics, LLC., Goleta, CA (US)

( * ) Notice: Subject to any disclaimer, the term of this patent is extended or adjusted under 35 U.S.C. 154(b) by 0 days.

(21) Appl. No.: 14/069,956

(22) Filed: Nov. 1, 2013

Related U.S. Application Data

(60) Provisional application No. 61/857,644, filed on Jul. 23, 2013.

(51) Int. Cl.
*H04B 10/50* (2013.01)
*H04B 10/516* (2013.01)

(52) U.S. Cl.
CPC .......... *H04B 10/5161* (2013.01); *H04B 10/506* (2013.01); *H04B 10/505* (2013.01); *H04B 10/5053* (2013.01)

(58) Field of Classification Search
CPC ........ H04B 10/11; H04B 10/25; H04B 10/50; H04B 10/501; H04B 10/503; H04B 10/504; H04B 10/505; H04B 10/5053
See application file for complete search history.

(56) References Cited

U.S. PATENT DOCUMENTS

| | | |
|---|---|---|
| 3,752,992 A | 8/1973 | Fluhr et al. |
| 3,939,341 A | 2/1976 | Graves et al. |
| 3,970,838 A | 7/1976 | Goodwin et al. |
| 3,984,835 A | 10/1976 | Kaplan et al. |
| 4,063,084 A | 12/1977 | Goodwin et al. |
| 4,168,397 A | 9/1979 | Bradley |
| 4,596,052 A | 6/1986 | Wright et al. |
| 4,622,672 A | 11/1986 | Coldren et al. |
| 4,870,654 A | 9/1989 | Cantoni et al. |
| 4,893,352 A | 1/1990 | Welford |
| 4,896,325 A | 1/1990 | Coldren |

(Continued)

FOREIGN PATENT DOCUMENTS

| | | |
|---|---|---|
| KR | 10-2004-0081838 | 9/2004 |
| KR | 10-2014-0077533 | 6/2014 |

(Continued)

OTHER PUBLICATIONS

Griffin, R.A, et. al. "Integrated Devices for Advanced Modulation Formats," 2004 IEEE/LEOS Workshop on Advanced Modulation Formats, pp. 39-40, Jul. 1-2, 2004.

(Continued)

*Primary Examiner* — Darren E Wolf
(74) *Attorney, Agent, or Firm* — Knobbe Martens Olson & Bear LLP

(57) ABSTRACT

A monolithic integrated optical transmitter comprising (a) an optical source including two output optical paths and (b) a modulator section that includes an interferometric optical signal combiner is described. Each of the two output optical paths of the optical source includes a reflector. The optical source is configured to output a first light beam through the first optical path and a second light beam through the second optical path. The optical transmitter is capable of generating advanced modulation format signals based on amplitude and phase modulation.

29 Claims, 5 Drawing Sheets

(56) References Cited

U.S. PATENT DOCUMENTS

| | | | |
|---|---|---|---|
| 4,903,341 A | 2/1990 | Rice | |
| 4,903,342 A | 2/1990 | Yamazaki | |
| 4,904,963 A | 2/1990 | Heidel | |
| 5,003,625 A | 3/1991 | Khoe | |
| 5,007,106 A | 4/1991 | Kahn et al. | |
| 5,008,957 A | 4/1991 | Kiyono | |
| 5,034,603 A | 7/1991 | Wilson | |
| 5,088,105 A | 2/1992 | Scifres et al. | |
| 5,101,450 A | 3/1992 | Olshansky | |
| 5,126,557 A | 6/1992 | Khoe et al. | |
| 5,170,274 A | 12/1992 | Kuwata et al. | |
| 5,181,136 A | 1/1993 | Kavehrad et al. | |
| 5,222,103 A | 6/1993 | Gross | |
| 5,237,292 A | 8/1993 | Chethik | |
| 5,323,258 A | 6/1994 | Tsushima et al. | |
| 5,347,608 A | 9/1994 | Nakamura et al. | |
| 5,351,317 A | 9/1994 | Weber | |
| 5,359,449 A | 10/1994 | Nishimoto et al. | |
| 5,412,226 A | 5/1995 | Rejman-Greene et al. | |
| 5,424,863 A | 6/1995 | Gertel | |
| 5,452,118 A | 9/1995 | Maruska | |
| 5,654,818 A | 8/1997 | Yao | |
| 5,915,051 A | 6/1999 | Damask et al. | |
| 6,020,963 A | 2/2000 | DiMarzio | |
| 6,078,412 A | 6/2000 | Fuse et al. | |
| 6,205,159 B1 | 3/2001 | Sesko et al. | |
| 6,271,950 B1 | 8/2001 | Hansen et al. | |
| 6,407,843 B1 | 6/2002 | Rowan et al. | |
| 6,407,845 B2 | 6/2002 | Nakamoto | |
| 6,421,155 B1 | 7/2002 | Yano | |
| 6,459,521 B1 | 10/2002 | Bakker et al. | |
| 6,556,327 B1 * | 4/2003 | Ohya | H04B 10/505 398/141 |
| 6,584,136 B2 | 6/2003 | Ju et al. | |
| 6,646,747 B2 | 11/2003 | Deliwala | |
| 6,661,975 B1 | 12/2003 | Hall et al. | |
| 6,704,375 B1 | 3/2004 | Serbe | |
| 6,757,499 B1 * | 6/2004 | Aoki | 398/182 |
| 6,781,741 B2 | 8/2004 | Uesaka | |
| 6,782,205 B2 | 8/2004 | Trisnadi | |
| 6,807,321 B2 | 10/2004 | Madsen | |
| 6,978,056 B2 | 12/2005 | Tavlykaev | |
| 7,023,601 B2 | 4/2006 | McGhan et al. | |
| 7,027,476 B2 | 4/2006 | Taghavi-Larigani et al. | |
| 7,035,486 B2 | 4/2006 | Griffin et al. | |
| 7,078,981 B2 | 7/2006 | Farag | |
| 7,103,239 B2 | 9/2006 | Kish | |
| 7,116,460 B2 | 10/2006 | Griffin | |
| 7,120,364 B2 | 10/2006 | Kovar | |
| 7,200,296 B2 | 4/2007 | Kish | |
| 7,209,664 B1 | 4/2007 | McNicol et al. | |
| 7,212,326 B2 | 5/2007 | Wooten et | |
| 7,245,788 B2 | 7/2007 | Fujita et al. | |
| 7,272,271 B2 | 9/2007 | Kaplan et al. | |
| 7,327,022 B2 | 2/2008 | Claydon | |
| 7,366,362 B2 | 4/2008 | Tanimura | |
| 7,457,496 B2 | 11/2008 | Joyner | |
| 7,460,793 B2 | 12/2008 | Taylor | |
| 7,466,882 B2 | 12/2008 | Kish | |
| 7,633,988 B2 | 12/2009 | Fish | |
| 7,751,658 B2 | 7/2010 | Welch | |
| 7,885,492 B2 | 2/2011 | Welch | |
| 8,401,399 B2 | 3/2013 | Barton | |
| 8,401,405 B2 | 3/2013 | Barton et al. | |
| 8,712,256 B2 | 4/2014 | Barton | |
| 8,718,486 B2 | 5/2014 | Barton | |
| 2003/0026302 A1 | 2/2003 | Anthon et al. | |
| 2005/0025419 A1 | 2/2005 | Fish et al. | |
| 2005/0111852 A1 * | 5/2005 | Mahgerefteh | G02B 5/281 398/187 |
| 2005/0123017 A1 | 6/2005 | Huang et al. | |
| 2005/0135733 A1 * | 6/2005 | Reid | G02B 6/4246 385/15 |
| 2005/0163186 A1 | 7/2005 | Petersen | |
| 2005/0213618 A1 | 9/2005 | Sochava et al. | |
| 2006/0193362 A1 | 8/2006 | Kopf et al. | |
| 2007/0122161 A1 | 5/2007 | Charlet et al. | |
| 2007/0133918 A1 | 6/2007 | Cho et al. | |
| 2007/0177882 A1 | 8/2007 | Akiyama | |
| 2007/0230617 A1 | 10/2007 | Tao et al. | |
| 2008/0056727 A1 | 3/2008 | Nishihara et al. | |
| 2008/0080872 A1 | 4/2008 | Tanaka et al. | |
| 2009/0245795 A1 | 10/2009 | Joyner | |
| 2009/0245796 A1 | 10/2009 | Little | |
| 2010/0091293 A1 | 4/2010 | Shani | |
| 2010/0202734 A1 | 8/2010 | DeCorby | |
| 2010/0303469 A1 * | 12/2010 | Barton | H04B 10/505 398/184 |
| 2011/0217002 A1 * | 9/2011 | Mekis | G02B 6/26 385/28 |
| 2011/0267676 A1 * | 11/2011 | Dallesasse et al. | 359/279 |
| 2012/0106984 A1 | 5/2012 | Jones et al. | |
| 2012/0205524 A1 | 8/2012 | Mack et al. | |
| 2013/0148982 A1 | 6/2013 | Barton | |
| 2014/0057413 A1 | 2/2014 | Yang | |
| 2014/0064659 A1 | 3/2014 | Doerr et al. | |
| 2014/0254978 A1 | 9/2014 | Koch et al. | |
| 2014/0348516 A1 | 11/2014 | Barton et al. | |
| 2014/0356001 A1 | 12/2014 | Barton et al. | |
| 2014/0360013 A1 | 12/2014 | Chen | |
| 2015/0098677 A1 | 4/2015 | Thacker et al. | |

FOREIGN PATENT DOCUMENTS

| | | |
|---|---|---|
| WO | WO 95/22070 | 8/1995 |
| WO | WO 03/079508 | 9/2003 |
| WO | WO 2007107187 | 9/2007 |
| WO | WO 2008/036313 | 3/2008 |
| WO | WO 2015/064225 | 5/2015 |

OTHER PUBLICATIONS

Kato, M. et. al., "Transmitter PIC for 10-Channel x 40Gb/s per Channel Polarization—Multiplexed RZ-DQPSK Modulation," in Optical Fiber Communication Conference, OSA Technical Digest (CD) (Optical Society of America, 2009), paper OThN2, Mar. 2009.

Seimetz M. "Performance of Coherent Optical Square-16-QAM-Systems based on IQ-Transmitters and Homodyne Receivers with Digital Phase Estimation," in Optical Fiber Communication Conference and Exposition and the National Fiber Optic Engineers Conference, Technical Digest (CD) (Optical Society of America, 2006), paper NWA4, Mar. 2006.

Seimetz M. "Multi-Format Transmitters for Coherent Optical M-PSK and M-QAM Transmission," Transparent Optical Networks, 2005, Proceedings of 2005 7th International Conference, vol. 2, pp. 225-229, Jul. 2005.

Doerr, C.R., et. al., "Monolithic InP 16-QAM Modulator," in Optical Fiber Communication Conference and Exposition and The National Fiber Optic Engineers Conference, OSA Technical Digest (CD) (Optical Society of America, 2008), paper PDP20, Feb. 2008.

Doerr, C.R., et. al., "Compact High-Speed InP DQPSK Modulator," IEEE, Photonics Technology Letters, vol. 19, No. 15, pp. 1184-1186, Aug. 2007.

Shin, M. et al., "A novel BPSK Method using Multiple Quantum Well Electro-Absorption Modulator Integrated with MMI couplers," International Topical Meeting on Microwave photonics, MWP'99 Digest, pp. 149-152, Nov. 1999.

Griffin, R.A, et. al., "Optical Differential Quadrature Phase-Shift Key (oDQPSK) for High Capacity Optical Transmission," in Optical Fiber Communications Conference, vol. 70 of OSA Trends in Optics and Photonics (Optical Society of America, 2002), paper WX6, Mar. 2002.

Di, L. et. al., "Single-Facet Folded-Cavity Diode Laser With Ultrasmall Bend Radius High-Index-Contrast Oxidized AlGaAs Ridge Waveguide," IEEE Photonics Technology Letters, vol. 19, No. 8, pp. 598-600, Apr. 2007.

Wang, S. et al., "Analysis of ring distributed feedback lasers," Journal of Applied Physics, vol. 45, No. 9, pp. 3978-3980,Sep. 1974.

Wesstrom, J.O, et. al.,"Design of a Widely Tunable Modulated Grating Y-branch Laser using the Additive Vernier Effect for Improved Super-mode Selection," Semiconductor Laser Conference, 2002, pp. 99-100.

(56) References Cited

OTHER PUBLICATIONS

Corzine, S. et al., "lO-Channel x 40Gb/s per channel DQPSK Monolithically Integrated InP-based Transmitter PIC," in National Fiber Optic Engineers Conference, OSA Technical Digest (CD) (Optical Society of America, 2008), paper PDP18, Feb. 2008.

Cho, P., et al., "Coherent Homodyne Detection ofBPSK Signals Using Time-Gated Amplification and LiNb03 Optical 90° Hybrid," IEEE Photonics Technology Letter, vol. 16, No. 7, pp. 1727-1729, Jul. 2004.

Cho, P., et al., "Investigation of2-b/slHz 40 Gb/s DWDM Transmission Over 4×100 km SMF-28 Fiber Using RZ-DQPSK and Polarization Multiplexing," IEEE Photonics Technology Letter, vol. 16, No. 2, pp. 656-658, Feb. 2004.

Cho, P., et al., "Transmission of 25-Gb/s RZ-DQPSK Signals with 25-GHz Channel Spacing Over 1000 km of SMF-28 Fiber," IEEE Photonics Technology Letter, vol. 15, No. 3, pp. 473-475, Mar. 2003.

Zhu, B., et al., "High Spectral Density Long-Haul 40-Gb/s Transmission Using CSRZ-DPSK Format," Journal of Lightwave Technology, vol. 22, No. 1, pp. 208-214, Jan. 2004.

Griffin, R.A., et al., "Integrated DQPSK Transmitter for Dispersion-Tolerant and Dispersion-Managed DWDM Transmission," in Optical Fiber Communications of Conference, (Optical Society of America, 2003), paper FP6, Mar. 2003.

Cobb, K.W. et al., "Reduction of optical phase noise in semiconductor lasers," Electronics Letters, vol. 18, Issue 8, pp. 336-337, Apr. 15, 1982.

Glance, B., "Performance of AFC for phase noise reduction of optical sources," Electronics Letters, vol. 21, Issue 21, pp. 994-996, Oct. 10, 1985.

Kikuchi, K. et al., "Design theory of electrically frequency-controlled narrow-linewidth semiconductor lasers for coherent optical communication systems," Journal of Lightwave Technology, vol. 5, Issue 9, pp. 1273-1276, Sep. 1987.

Langley et al., "Packaged semiconductor laser optical phase-locked loop (OPLL) for photonic generation, processing and transmission of microwave signals," IEEE Transactions on Microwave Theory and Techniques, Vo. 47, pp. 1257-1264, Jul. 1999.

Camatel, S. et al., "Optical phase-locked loop for coherent detection optical receiver," Electronics Letters, vol. 40, No. 6, pp. 384-385 Mar. 18, 2004.

Ferrero, V. et al., "A novel optical phase locked loop architecture based on sub-carrier modulation", in Optical Fiber Communication Conference, Technical Digest (CD) (Optical Society of America, 2004), paper FN6, Feb. 2004.

Tsukamoto, S. et al., "Coherent demodulation of optical multilevel phase-shift-keying signals using homodyne detection and digital signal processing", IEEE Photonics Technology Letters, vol. 18, No. 10, pp. 1131-1133, May 2006.

Noe, R. "Phase noise-tolerant synchronous QPSKlBPSK baseband-type intradyne receiver concept with feedforward carrier recovery," Journal of Lightwave technology, vol. 23, No. 2, pp. 802-808, Feb. 2005.

Matsui, Y., et. al. "Widely tuneable modulated grating Y-branch Chirp Managed Laser," in Optical Communication, 2009. ECOC '09. 35th European Conference on, vol. 2009-Supplement, No., pp. 1-2, Sep. 20-24, 2009.

Notice of Allowance mailed on Jun. 9, 2015 in U.S. Appl. No. 14/267,582.

Notice of Allowance mailed on Jun. 2, 2015 in U.S. Appl. No. 14/263,855.

Notice of Allowance dated Sep. 9, 2015 in U.S. Appl. No. 14/263,855.

Notice of Allowance dated Oct. 14, 2015 in U.S. Appl. No. 14/267,582.

U.S. Appl. No. 61/182,017, filed May 28, 2009, which is a priority application of U.S. Appl. No. 12/789,350 which published as U.S. Publication No. 2010/0303469 on Dec. 2, 2010.

* cited by examiner

INTEGRATED INTERFEROMETRIC OPTICAL TRANSMITTER

CROSS-REFERENCE TO RELATED APPLICATIONS

This application claims the benefit under 35 U.S.C. §119(e) of U.S. Provisional Application 61/857,644 filed on Jul. 23, 2013 titled "Integrated Interferometric Optical Transmitter," which is hereby expressly incorporated by reference herein in its entirety.

This application hereby expressly incorporates by reference herein in its entirety each of the following applications: (i) U.S. Provisional Application No. 61/182,022 filed on May 28, 2009; (ii) U.S. Provisional Application No. 61/182,017 filed on May 28, 2009; (iii) U.S. application Ser. No. 12/789,344 filed on May 27, 2010; and (iv) U.S. application Ser. No. 12/789,350 filed on May 27, 2010.

BACKGROUND

1. Field of the Invention

Various embodiments of the invention relate to the area of optical communications photonic integrated circuits (PICs). In particular, the embodiments described herein generally relate to integrated widely tunable optical transmitters capable of generating optical signals in various modulation formats at different optical wavelengths for optical communications applications.

2. Description of the Related Art

As demand for higher capacity in optical networks continues to grow, ways to increase optical network capacity with reduced capital investment are of interest. One cost efficient solution that allows for reduction in capital investment is chip-scale integration of optical components, such as, for example, optical transmitters and receivers, which can allow for mass production of these devices. These tunable devices can be made to support a number of modulation formats, such as traditional amplitude modulation, On-Off Keying, as well as more complex modulation formats, Quadrature Amplitude Modulation (QAM), Phase Shift Keying (PSK), and Quadrature Phase Shift Keying (QPSK). Modulation formats such as Quadrature Phase Shift Keying and Quadrature Amplitude Modulation can allow for a number of data symbols to be sent utilizing the same line rate as a lower bit-rate On-Off keyed system. The complex modulation formats can be spectrally efficient and can improve the efficiency of fiber Wavelength Division Multiplexing (WDM). Spectrally efficient modulation formats can also allow for maximum utilization of the existing optical network infrastructure with increased data throughput capacity.

SUMMARY

Systems and methods that enable an optical transmitter capable of generating optical signals with various modulation formats may be beneficial in optical networks and systems. Example embodiments described herein have several features, no single one of which is indispensable or solely responsible for their desirable attributes. Without limiting the scope of the claims, some of the advantageous features will now be summarized.

PICs for optical transmitters capable of generating optical signals having different modulation formats can utilize embodiments of an optical source that emits a single beam of light from a single output interface that is coupled to a single output waveguide which is integrated with an optical modulator having two input waveguides and at least one output waveguide. The optical modulator includes an optical splitter having one input waveguide and two output waveguides to facilitate integration of the optical modulator with the optical source having a single output waveguide. In various embodiments, the optical modulator can be a Mach-Zehnder modulator that comprises an input light splitter, two waveguide branches including phase and/or amplitude electrodes, and an output light combiner that interferometrically combines the signals from the two waveguide branches. In various embodiments described herein an optical source that is configured to emit two beams of light at substantially the same wavelength along two different output optical paths is coupled to/drives an optical modulator having two input waveguides and at least one output waveguide.

For example, various embodiments described herein comprise an optical source including two output optical paths. Each of the first optical path and the second optical path includes a reflector. Each of the first and second optical paths is coupled to an active region comprising an active material. In various embodiments, the first optical path forms a portion of a first laser resonator and the second optical path forms a portion of a second laser resonator. In such embodiments, the first laser resonator is configured to generate a first optical beam output via the first optical path and the second laser resonator is configured to generate a second optical beam output via a second optical path. In some embodiments, the first and the second optical paths can be parts of a single laser resonator. In such embodiments, light generated by the single laser resonator is split between the first and the second optical paths as first and second optical beams. The first and second optical beam can have substantially the same wavelength. In various embodiments, optical phase of the first and second optical beams can be correlated. In some embodiments, optical phase of the first and second optical beams can be uncorrelated. In various embodiments, the first and second optical beams can be optically decoupled in phase. The optical source is monolithically integrated with an optical modulator section such that the two output optical paths of the optical source form the input optical paths of the optical modulator. At least one of the two output optical paths includes an electrode configured to provide phase and/or amplitude modulation to the optical signal propagating in that optical path. Additional electrodes can be integrated with one or both of the two output optical paths to control the amplitude and/or phase of the optical signal propagating there-through. Such a monolithically integrated optical transmitter can be used to generate optical signals having different modulation formats. Various embodiments of the monolithically integrated optical transmitter can also be configured to output an optical signal with low chirp which can advantageously increase signal transmission distance.

The optical source can be configured such that the output power of the optical signal in each of the two output optical paths is equal. Alternately, the optical source can be configured such that the output power of the optical signal in each of the two output optical paths is unequal. The two output optical paths can optionally include semiconductor optical amplifiers (SOAs), polarization controllers or other optical components that can be used to control the characteristics (e.g., amplitude, phase, polarization, chirp etc.) of the optical signals propagating there-through. The optical modulator section includes an optical signal combiner that is integrated with the two output optical paths such that a section of a first output optical path between a first reflector and the combiner has a length L1 and a section a second output optical path between a second reflector and the combiner has a length L2. In various embodiments, the lengths L1 and L2 can be approximately equal. In other embodiments, the lengths L1 and L2 can be unequal. Optical signal propagating through the two output optical paths is interferometrically combined by the optical signal combiner to provide modulated light output. Similar arrangement of optical components can be used to implement a dual (nested) Mach-Zehnder modulator.

An optical transmitter obtained by monolithically integrating two output optical paths with an optical signal combiner can be compact. For example, the length of the optical transmitter formed by monolithically integrating an optical source including two output optical paths with an optical combiner can be about half the length of a conventional laser integrated with an optical modulator (e.g. a Mach-Zehnder interferometer, a vector modulator, etc.). Additionally, the optical transmitter obtained by monolithically integrating a dual output optical source with an optical signal combiner can be configured to provide chirp control. Such embodiments can be used to generate optical signals with advanced modulation formats that (i) have high optical power; (ii) are capable of being transmitted through large distances; (iii) can be tuned over a wide wavelength range; (iv) have low chirp; (v) have low phase noise; and (vi) low spectral line width.

Various embodiments describe a monolithically integrated interferometric optical transmitter that can translate an electric signal into an optical signal with both amplitude and/or phase encoding. The optical transmitter can be used to generate optical signals with Quadrature Amplitude Modulation (QAM), and other modulation techniques that form a subset of QAM modulation, for example, Differential Phase Shift Keying (DPSK), Binary Phase Shift Keying (BPSK), Quadrature Phase Shift Keying (QPSK) and Differential Quadrature Phase Shift keying (DQPSK). Various embodiments of the interferometric optical transmitter described herein can generate optical signals with any of the modulation formats discussed above, with chirp control by using a dual front mirror, dual output waveguide laser.

An innovative aspect of the subject matter described in this disclosure includes an optical transmitter comprising a substrate, an optical source and an optical signal combiner. The optical source comprises a first optical path including a first reflector, a second optical path including a second reflector and a first active region comprising an active material. In various implementations, at least one the first and the second optical paths can be straight. In some implementations, at least one of the first and the second optical paths can be curved. The first active region is coupled to at least one of the first and second optical paths. The first optical path is configured to output a first light beam, the first light beam having a wavelength $\lambda 1$ and a first optical phase $\phi 1$, the second optical path configured to output a second light beam, the second light beam having a wavelength $\lambda 2$ and a second optical phase $\phi 2$. At least one modulating electrode is integrated with at least one of the first and second optical paths. In various implementations, an amplitude and/or a phase of at least one of the first and second light beams can be modulated in response to an electric field applied to the at least one modulating electrode. The optical signal combiner interferometrically combines equally or unequally light propagating in the first and second optical paths to generate an output optical signal. In various implementations, the optical signal combiner can be a multimode interference coupler.

In various implementations, the wavelength of the first light beam can be equal to the wavelength of the second light beam. In various implementations, the wavelength of the first light beam can be within 10% of the wavelength of the second light beam. In various implementations, the first optical phase can be correlated with the second optical phase. In various implementations, the first optical phase can be uncorrelated with the second optical phase. In various implementations, the first and/or the second light beam can be single mode. In various implementations, the first wavelength and/or the second wavelength can be in a range between 1500 nm and 1600 nm. In various implementations, the first wavelength and/or the second wavelength can be in a range between 1300 nm and 1500 nm. In various implementations, the first wavelength and/or the second wavelength can be in a range between 1600 nm and 1800 nm. In various implementations, the output optical signal can have an optical power between about 0.1 mW and about 500 mW. For example, the optical power can be between about 0.1 mW and about 1 mW, about 1.0 mW and about 10 mW, about 10 mW and about 100 mW, about 100 mW and about 500 mW, etc. In various implementations, the first and/or the second light beam can have a spectral line-width between about 1 kHz and about 100 MHz. For example, the spectral line-width can be between about 1 kHz and about 10 kHz, about 10 kHz and about 100 kHz, about 100 kHz and about 1 MHz, about 1 MHz and about 10 MHz, about 10 MHz and about 100 MHz, etc.

In various implementations, the first optical path can include a first waveguide structure and the second optical path can include a second waveguide structure. In various implementations, the first active region can be formed on an epitaxial layer of the substrate and the first and second waveguides can be formed on the substrate in the same epitaxial layer as the first active region. In some implementations, the first active region can be formed on an epitaxial layer of the substrate and the first and second waveguides can be formed on the substrate in a different layer. In some such implementations, the different layer can be an epitaxial layer. In other such implementations, the different layer can be a non-epitaxial layer. In various implementations, the first optical path can include a first end of a waveguide structure and the second optical path can include a second end of the waveguide structure. In various implementations, the first active region can be formed on an epitaxial layer of the substrate and the waveguide structure can be formed on the substrate in the same epitaxial layer as the first active region. In various implementations, the first active region can be formed on an epitaxial layer of the substrate and the waveguide structure can be formed on the substrate in a different layer. In some such implementations, the different layer can be an epitaxial layer. In other such implementations, the different layer can be a non-epitaxial layer.

In various implementations, the first active region can be disposed between the first and the second reflectors. In various implementations, the optical source can include a third optical path. In some implementations, the third optical path can include a third reflector. In various implementations, the third reflector can comprise an interface that includes a high reflective coating. In various implementations, the third reflector can be disposed such that the first active region is between the first reflector and the third reflector. In various implementations, the third reflector can be disposed such that the first active region is between the first reflector and the third reflector. In various implementations, at least one of the first reflector or the second reflector can have a reflectivity between about 4% and about 70%. For example, the reflectivity can be between about 4% and about 10%, about 10% and about 20%, about 20% and about 30%, about 30% and about 40%, about 40% and about 50%, about 50% and about 60%, about 60% and about 70%, etc. In various implementations, the first reflector and/or the second reflector can comprise a grating. In various implementations, the first reflector and/or the second reflector can comprise a sampled grating.

In various implementations, the optical source includes an optical splitter. The first and second optical paths can be a part of the optical splitter. In various implementations, the first active region can comprises the optical splitter. In various implementations, the optical source can comprise a second active region. In some such implementations, the first optical path can be coupled to the first active region and the second optical path can be coupled to the second active region. In some such implementations, the first active region can be disposed in the first optical path between the optical splitter and the first reflector and the second active region can be disposed in the second optical path between the optical splitter and the second reflector. In various implementations, the first active region can be disposed between the first and second optical paths such that the first and second optical paths can be disposed on either side of the first active region and connected to the first active region by straight or curved sections. In various implementations, the first active region can be connected to the first and second optical paths by total internal reflection mirrors.

BRIEF DESCRIPTION OF THE DRAWINGS

In the following description of the various embodiments, reference is made to the accompanying drawings which form a part hereof, and in which is shown by way of illustration various embodiments of the device.

It is to be understood that other embodiments may be utilized and structural changes may be made without departing from the scope of present invention.

Figure 1A:
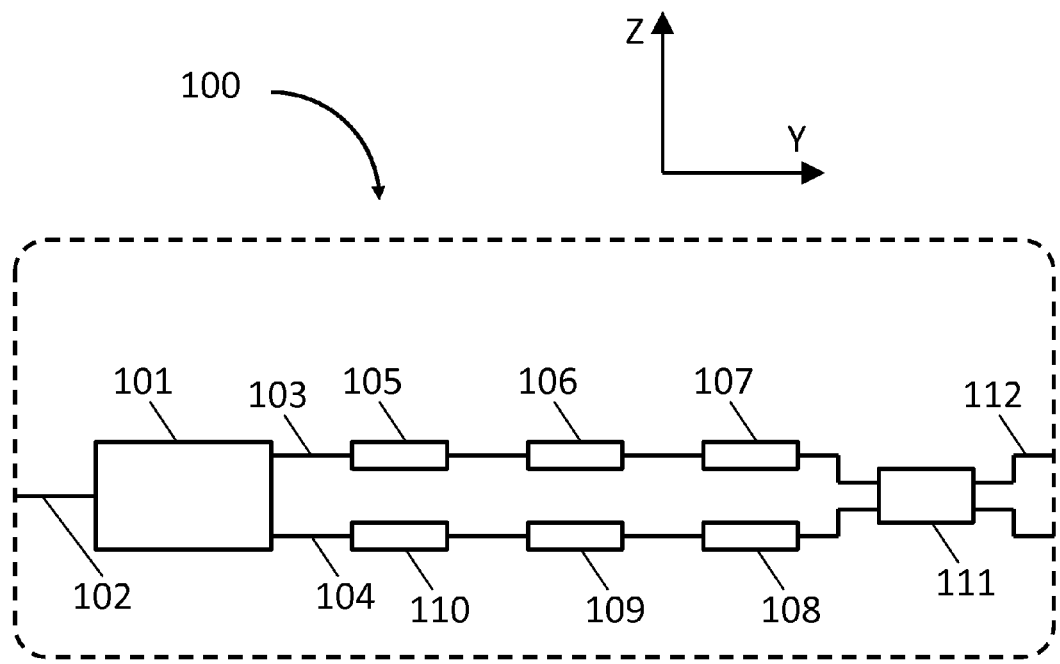
FIGS. 1A and 1B schematically illustrate an embodiment of an optical transmitter that includes an optical source comprising two output optical paths. The optical source is configured to emit a first light beam along a first output optical path and a second light beam along a second output optical path. The optical source is monolithically integrated with an optical signal combiner that is configured to interferometrically combine the two light beams propagating through the two output optical paths.

These and other features will now be described with reference to the drawings summarized above. The drawings and the associated descriptions are provided to illustrate embodiments and not to limit the scope of the disclosure or claims. Throughout the drawings, reference numbers may be reused to indicate correspondence between referenced elements. In addition, where applicable, the first one or two digits of a reference numeral for an element can frequently indicate the figure number in which the element first appears.

DETAILED DESCRIPTION OF THE PREFERRED EMBODIMENT

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied using a variety of techniques including techniques that may not be described herein but are known to a person having ordinary skill in the art. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein. It will be understood that when an element or component is referred to herein as being "connected" or "coupled" to another element, it can be directly connected or coupled to the other element or intervening elements may be present therebetween.

Figure 1B:
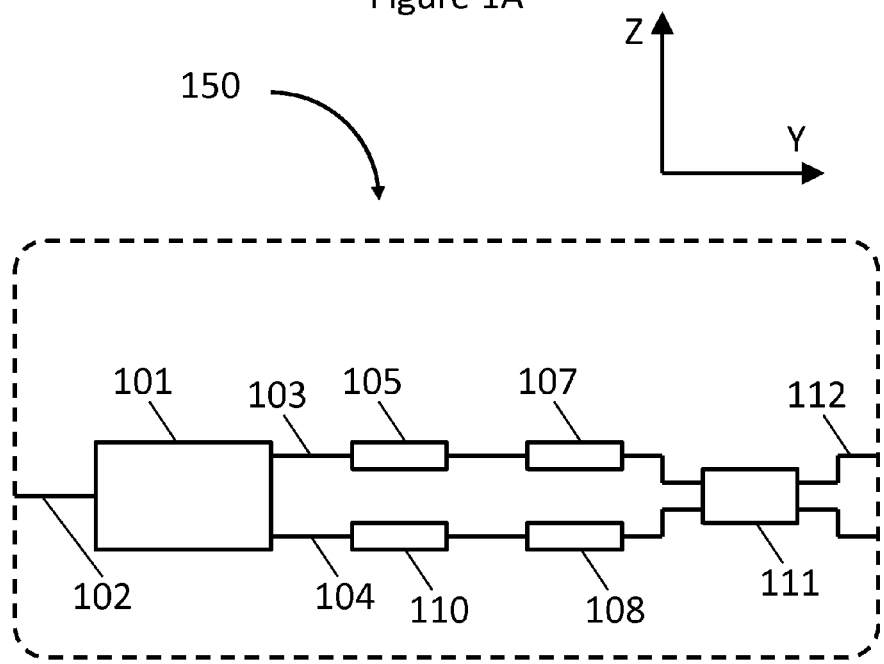

FIGS. 1A and 1B schematically illustrate embodiments of an optical transmitter that includes an optical source comprising two output optical paths. The optical source is configured to emit a first light beam along a first output optical path and a second light beam along a second output optical path. The optical source is monolithically integrated with an optical signal combiner that is configured to interferometrically combine the two light beams propagating through the two output optical paths. FIG. 1A schematically illustrates an embodiment of a monolithic semiconductor optical transmitter 100 that includes an optical source 101 two output optical paths 103 and 104 that is monolithically integrated with a modulator section that includes an optical signal combiner 111. The two output optical paths 103 and 104 can each be coupled to an active region comprising an active material that generates a light output in response to an applied electrical field. The two output optical paths 103 and 104 can each include a reflector. In various embodiments, the first output optical path 103 and the reflector therein forms a portion of a first laser resonator and the second output optical path 104 and the reflector therein forms a portion of a second laser resonator. In such embodiments, the first laser resonator generates a first light beam that is output through the first output optical path 103. The second laser resonator generates a second light beam that is output through the second output optical path 104. In various embodiments, the first and the second output optical paths 103 and 104 together with the reflectors therein are parts of a single laser resonator. In such embodiments, light generated by the single resonator is split between the first and the second optical paths 103 and 104 as first and second light beams. In various embodiments, the first and the second light beams can have the same wavelength. In various embodiments, a wavelength of the first light beam can be within about 0.1%-1% of the wavelength of the second light beam. In various embodiments, the optical source 101 can be configured such that the wavelengths of the first and second light beams are locked to a desired wavelength using a wavelength locking mechanism. In various embodiments, optical phase of the first and second light beams can be correlated. In some embodiments, optical phase of the first and second light beams can be uncorrelated. In various embodiments, the first and second light beams can be optically decoupled in phase. In various embodiments, the first light beam can have a phase $\Phi_1$ and the second light beam can have a phase $\Phi_2$. The difference between phase $\Phi_1$ and $\Phi_2$ can be constant over a duration of time, t, and randomly correlated with each other. In various embodiments, the duration of time, t, over which the difference between phase $\Phi_1$ and $\Phi_2$ remains constant can be 10 minutes, 20 minutes, 30 minutes, 1 hour, 5 hours, 10 hours, 1 day, 10 days, 1-12 months, 1 year, 5 years, 10 years, etc. In various embodiments, the optical source 101 can include a third output optical path 102 to provide additional access to the optical signals generated by the source 101. In various embodiments, a portion of the third output optical path 102 can be configured to be reflective.

The optical signal combiner 111 is configured to interferometrically combine optical signals propagating through the two output optical paths 103, 104. The optical transmitter 100 illustrated in FIG. 1 can be considered as an integrated optical component that includes an optical source with dual output optical paths that emits two light beams having substantially the same wavelength and an optical modulating section that is integrated with the dual lasing sections. As discussed above, the optical source 101 comprises with a first output optical path 103 and a second output optical path 104. In various embodiments, an optical amplifier section (e.g., 105 and 108) can be optionally integrated with one or both of the output optical paths 103 and 104. In various embodiments, the optical amplifier section (e.g., 105 and 108) can be a semiconductor optical amplifier (SOA). The optical amplifier section 105 can advantageously be used to adjust output power in the optical path with which it is integrated (e.g., output optical path 103 in the illustrated embodiment).

In various embodiments, a phase tuning section (e.g., 106 and 109) can be optionally integrated with one or both the output optical paths 103 and 104 to adjust the phase of optical signals propagating there-through. In various embodiments, the phase of the optical signal propagating through the optical path 103 and/or 104 can be adjusted by applying an electrical voltage between about +0.0 V and about +3 V to the phase tuning section (e.g., 106 and 109). In various embodiments, modulator electrodes (e.g., 107 and 110) can be integrated with one or both the output optical paths 103 and 104 to modulate the phase and/or intensity of the signals propagating through the output optical paths 103 and 104. Intensity and/or phase of the optical signal propagating through the optical paths 103 and 104 can be changed by applying an electric field to the modulator electrodes 107 and 110. In various embodiments, an electrical voltage between about +0.7V and about −5V can be applied to the modulator electrodes 107 and 110 to change the intensity and/or phase. FIG. 1B illustrates an embodiment of a monolithic semiconductor optical transmitter 150 which does not include a phase tuning section in the output optical paths 103 and 104.

In various implementations, the modulator electrodes 107 and 110 and/or the phase tuning sections 106 and 109 can comprise conducting pads disposed on the output optical paths 103 and 104. Although in the illustrated embodiment, modulator electrodes and phase tuning sections are integrated with both the output optical paths, in some embodiments, the modulator electrodes and phase tuning sections can be integrated with only one of the output optical paths. The modulator electrodes (e.g., 107 and 110) can be configured to provide high-speed modulation to the optical signals propagating through the output optical paths 103 and 104. For example, the modulator electrodes can include materials and/or structures that have low capacitance (e.g., a typical range between about 50 fF and 1 pF) such that the optical signals propagating through the output optical paths 103 and 104 can be modulated at a speed of about 100 Mbps to about 40 Gbps. For example, the optical signals propagating through the output optical paths 103 and 104 can be modulated at a speed between about 100 Mbps-622 Mbps; between about 622 Mbps-about 2.5 Gbps, between about 2.5 Gbps-about 10 Gbps or between about 10 Gbps-about 40 Gbps. The phase tuning sections (e.g., 106 and 109) can be configured to receive an electric field that includes low-frequency components (e.g., a DC voltage or a low-frequency AC voltage). Accordingly, the phase tuning sections can include materials and/or structures that have high capacitance (e.g., a typical range between about 1 pF and 10 pF).

The optical source 101 is integrated with an optical combiner 111 such that the output optical paths 103 and 104 of the source 101 are the input optical paths of the optical combiner 111. The optical combiner 111 can be a multimode interference coupler (MMIC), a directional coupler or any other optical coupler that is capable of interferometrically combining two input optical signals. The optical coupler 111 is configured such that signal propagating through the first output optical path 103 and the optical signal propagating through the second output optical path 104 constructively or destructively interfere at the output of the combiner 111. The optical combiner 111 can include one or two optical paths (e.g. output optical path 112) to output the interferometrically combined phase and/or amplitude modulated optical signal. In various implementations, a mode-converter can be integrated with the output waveguide of the combiner 111 to efficiently couple the modulated signal output to an optical fiber or any other optical signal transmission medium.

The integrated optical transmitter 100 illustrated in FIG. 1 can have several advantages over an optical transmitter including an optical source with a single output interface configured to emit a single light beam and that is integrated with an optical modulator with two inputs. For example, a length of the integrated optical transmitter 100 can be about 30%-about 60% shorter than an optical transmitter including an optical source with a single output interface configured to emit a single light beam and that is integrated with an optical modulator with two inputs. As another example, an optical transmitter including an optical source with a single output interface configured to emit a single light beam and that is integrated with an optical modulator with two inputs comprises an optical splitter disposed between the optical source and the optical modulator. This optical splitter can cause a reduction in the optical power of the output modulated signal and/or a reduction in the signal to noise ratio (SNR) of the output modulated signal. Since, the integrated optical transmitter 100 illustrated in FIG. 1 does not include an optical splitter disposed between the optical source and the optical modulator, the output modulated signal can have higher optical power and/or higher SNR. For example, the optical power of the output modulated signal from the integrated optical transmitter 100 can be about 10% to about 60% higher than the optical power of the output modulated signal from an optical transmitter with an optical source having a single output interface configured to emit a single light beam. The optical power and/or the SNR of the output modulated signal from the integrated optical transmitter 100 can be further increased by integrating optical amplifying sections in the two output optical paths.

Contrary to the expectations of a person having ordinary skill in the art, the optical source 101 configured to emit two light beams via two output optical paths, has performance characteristics that are better than or similar to a comparable optical source with a single output optical path and configured to emit a single light beam. For example, it is noted that the un-modulated output optical signal from the integrated optical transmitter 100 is single mode and has side-mode suppression greater than 40 dB. It is also noted that the un-modulated output optical signal from the integrated optical transmitter 100 has a spectral line-width between about 1 kHz and about 100 MHz. Thus, the phase noise of the un-modulated output optical signal is comparable to the phase noise of a light beam generated by an optical source with a single output. Accordingly, the amount of amplitude noise resulting from a conversion of phase noise to amplitude noise at the output of the interferometric signal combiner 111 is sufficiently small and does not have any practical impact on the overall noise performance of devices including an optical source configured to emit two light beams via two output optical paths. Additional details of the optical source with two output optical paths, each output optical path including a reflector, are discussed with reference to FIGS. 2-5 below.

The integrated optical transmitter 100 comprising the optical source 101 with two optical paths 103 and 104 and the interferometric signal combiner 111 can be monolithically integrated on a single die having a common substrate. Monolithic common substrate integration can include processes and techniques that place all the subcomponents (e.g., optical source 101 with two optical paths 103 and 104 and the interferometric signal combiner 111) of the integrated optical transmitter 100 on a common substrate through semiconductor device processing techniques (e.g. deposition, epitaxial growth, wafer bonding, wafer fusion, etc). In some embodiments, the integrated optical transmitter 100 can be vertically integrated over a single die having a common substrate, through other techniques such as flip-chip bonding, etc. Monolithic integration of different sub-components on a common substrate can provide a reduction in insertion loss between different sub-components of the integrated optical transmitter 100. This can advantageously increase the optical power of the signal output by the integrated optical transmitter and/or the SNR of the output signal. Other advantages of the integrated optical transmitter 100 is compact die size, reduced footprint, faster tuning mechanisms, and the lack of moving parts—which can be desirable for applications subject to shock, vibration or temperature variation. Integrating the different sub-components of the optical transmitter 100 on a single die can offer several other advantages, such as, for example, precise phase control, improved performance and stability of the transmitter, and compact embodiment. Some additional benefits of integrating the optical transmitter on a single die can be: the ability to adjust or optimize the device performance; ability to control and optimize the bias of the modulators for every single wavelength—(the wavelength information and/or other parameters known for an integrated transmitter, but not known when a discrete modulator is used). Embodiments of the monolithically integrated optical transmitter described herein can advantageously improve the reliability, performance, and stability of optical components and reduce the cost of such devices.

In various embodiments, the common substrate on which the integrated optical transmitter 100 is disposed can be a monocrystalline substrate comprising a III-V material such as Indium Phosphide and one or more epitaxial layers (InP, InGaAs, InGaAsP, InAlGaAs etc.). The active portion of the optical source 101 (e.g., the active region and the reflectors) can be formed on the common substrate in a first epitaxial layer. In various embodiments, the optical amplifier sections 105 and 108 can be formed in the first epitaxial layer. In some embodiments, the optical amplifier sections 105 and 108 can be formed in an epitaxial layer different from the first epitaxial layer. The inactive portions of the integrated optical transmitter 100, such as, for example, the optical signal combiner 111, the plurality of optical paths (e.g., arms or branches that are coupled to the signal combiner 111), the electrodes 107 and 110 and the phase tuning sections 106 and 109 can be formed on the common substrate in the first epitaxial layer or a different epitaxial layer.

In various embodiments, the one or more epitaxial layers can be formed by depositing a monocrystalline film on a monocrystalline substrate. In various embodiments, epitaxial layers can be grown from gaseous or liquid precursors. Because the substrate acts as a seed crystal, the deposited epitaxial structure takes on a lattice structure and orientation identical to those of the substrate. In various embodiments, the epitaxial layers comprises InGaAsP/InGaAs or InAlGaAs layers on either a GaAs or InP substrate grown with techniques such as MOCVD or Molecular Beam Epitaxy (MBE). In various embodiments, the one or more epitaxial layers can include InGaAsP/InGaAs or InAlGaAs layers which are bonded or fused onto Silicon, Silicon Oxide, or silicon-on-insulator (SOI) material.

In various embodiments, the active portion of the optical source (e.g., the active region and the reflectors) can be formed on a first substrate in one or more epitaxial layers. The first substrate can be fused or adhered to a second substrate including one or more waveguides and the optical modulator section including the optical signal combiner 111, the plurality of optical paths (e.g., arms or branches that are coupled to the signal combiner 111), the electrodes 107 and 110 and the phase tuning sections 106 and 109. The one or more waveguides and the optical modulator section can be formed in one or more epitaxial/non-epitaxial layers of the second substrate. In various embodiments, the first substrate can be laterally or edge-wise coupled with the second substrate. In some embodiments, the first substrate can be vertically coupled with the second substrate.

In various embodiments, the common substrate can include a semiconductor material. In some embodiments, the common substrate can include a dielectric or an insulator. In various embodiments, the integrated optical transmitter 100 can include an active III-V material that is adhered to a silicon-on-insulator (SOI) material using a process such as wafer fusion or wafer bonding. Further details of the various optical sub-components of the integrated optical transmitter 100 are provided below.

Optical Source with Dual Output Optical Paths

Figure 2:
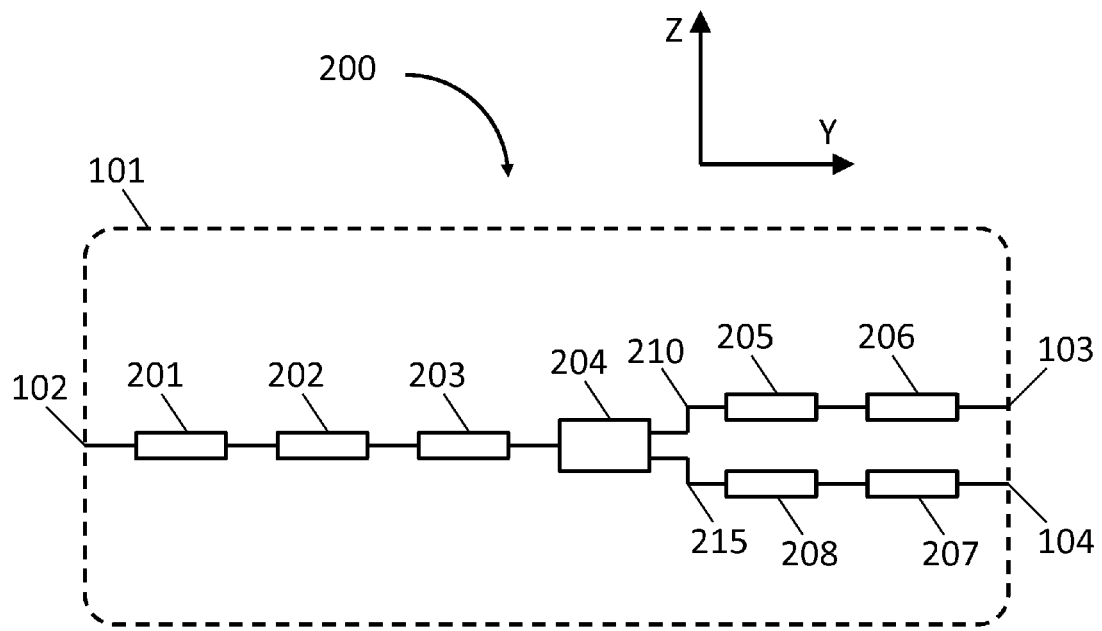
FIG. 2 schematically illustrates a first embodiment of an optical source including a first and a second output optical path that are coupled to an active region comprising an active material. A first output optical path including a section of a first waveguide and a first reflector. A second output optical path includes a section of a second waveguide and a second reflector.

FIGS. 2-5 schematically illustrate different embodiments of the optical source 101 with dual output optical paths that are configured to emit two light beams via the dual output optical paths. Various embodiments of an optical source including two output optical paths are also disclosed in U.S. Provisional App. No. 61/182,017 which is incorporated by reference herein in its entirety. FIG. 2 schematically illustrates a first embodiment of an optical source 200 including an active region 202 comprising an active material that is configured to generate light when an electric field is applied to the active region. The active region 202 is coupled to two output optical paths 103 and 104. The first output optical path 103 includes a section of a first waveguide 210 and a first reflector 206. The second output optical path 104 includes a section of a second waveguide 215 and a second reflector 207. The optical source 200 includes a third optical path 102 that is coupled to the active region 202. The third optical path 102 includes a third reflector 201. The reflectors 206 and 201 can form a first laser resonator configured to generate a first light beam and the reflectors 207 and 201 can form a second laser resonator configured to generate a second light beam. The reflectors 206 and 207 can form the front mirrors of the first and second laser resonators while the reflector 201 forms the back mirror of the first and second laser resonators. In various embodiments, it may not be possible to optically decouple the first and the second laser resonators. Accordingly, the first and the second laser resonators can be considered to be a part of a single laser resonator for various practical applications.

When an electric field is applied to the various parts of the laser resonators (e.g., the active region 202 and the reflectors 206, 207 and 201), the optical source 101 can generate light having a wavelength λ which is coupled into the output waveguides 210 and 215 such that it propagates through the output optical paths 103 and 104. In the embodiment illustrated in FIG. 2, the waveguides 210 and 215 can be the output waveguides of an optical splitter 204 that is optically coupled to the active region 202 through an input waveguide. The optical splitter 204 can be a MMI splitter, a directional splitter or any other optical splitter that is capable of splitting an optical signal between two optical paths. The optical splitter 204 can be configured to split the generated light equally or unequally between the two optical paths 103 and 104. In various embodiments, the active region 202 can include the optical splitter 204 and parts of the waveguides 210 and 215. The optical source 101 can include one or more phase tuning sections (e.g., 203, 205 and 208) configured to control or adjust the phase of the generated light in the input waveguide of the optical splitter 204 or the output waveguides 210 and 215.

Figure 3:
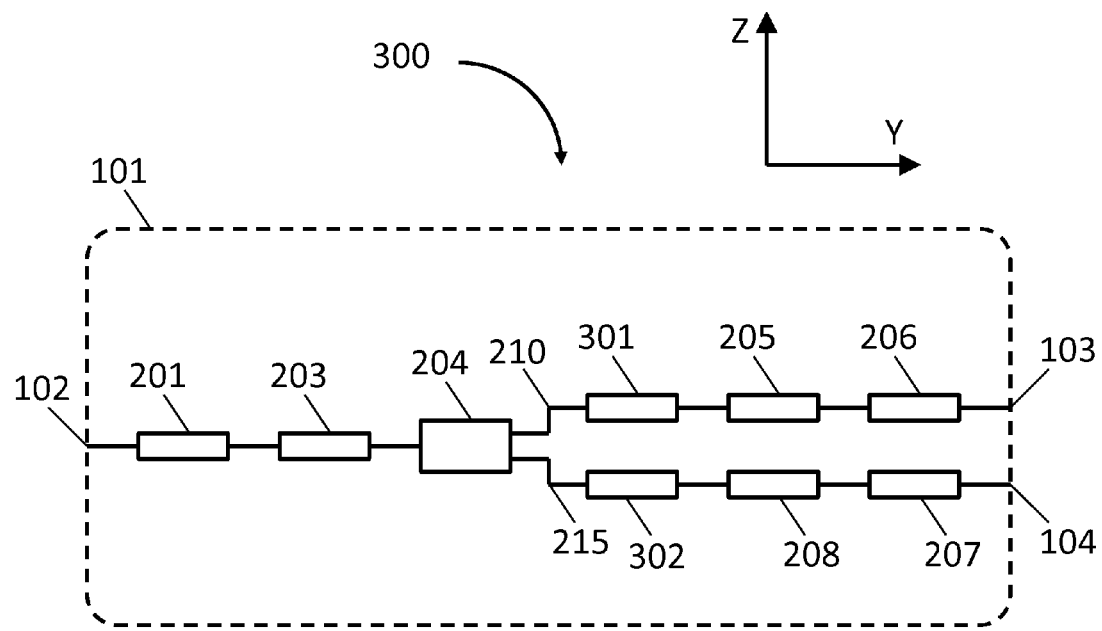
FIG. 3 schematically illustrates a second embodiment of an optical source having two output optical paths. A first output optical path includes a first active region comprising an active material, a section of a first waveguide and a first reflector. A second output optical path includes a second active region comprising an active material, a section of a second waveguide and a second reflector.

FIG. 3 schematically illustrates a second embodiment of an optical source 300 having two output optical paths 103 and 104. The optical source 300 includes a first active region 301 disposed in the first optical path 103 and a second active region 302 disposed in the second optical path 104. Thus, in contrast to the embodiment illustrated in FIG. 2, the optical source 300 does not include a common active region that is coupled to the two output optical paths 103 and 104. This arrangement can advantageously reduce the overall device footprint, increase the optical power and/or SNR of the output optical signal.

Figure 4A:
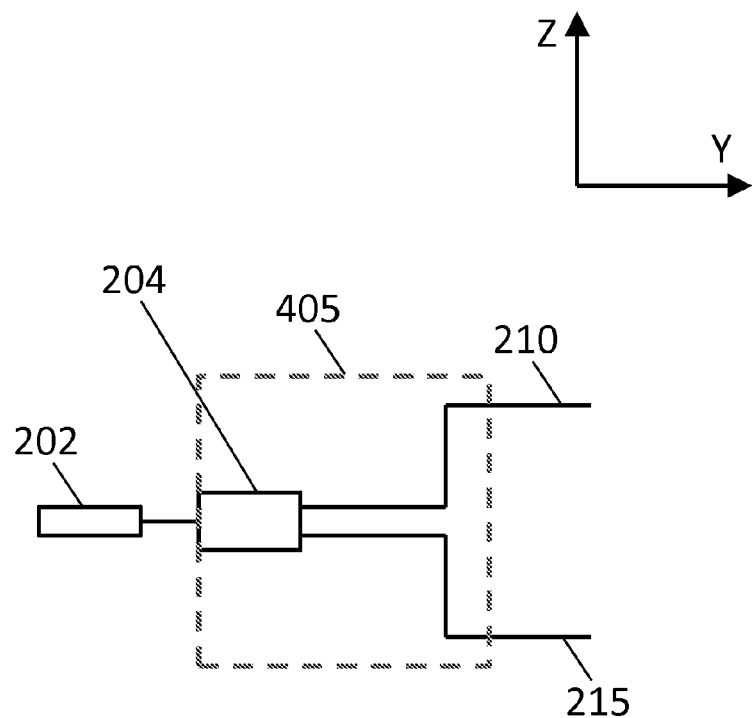
FIG. 4A-4C schematically illustrate embodiments including an optical splitter that at least partially includes gain material.
Figure 4B:
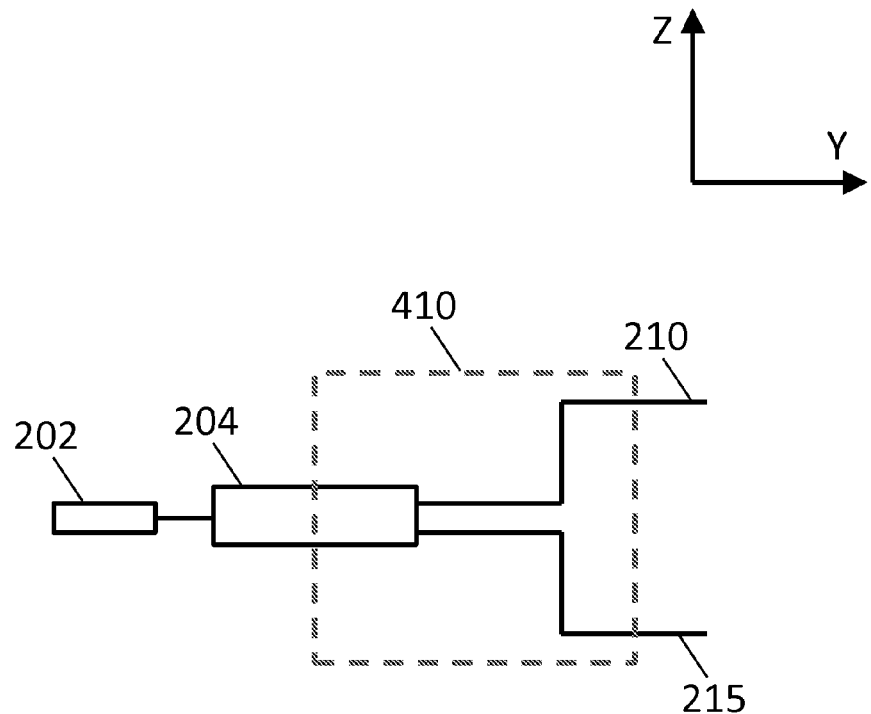
Figure 4C:
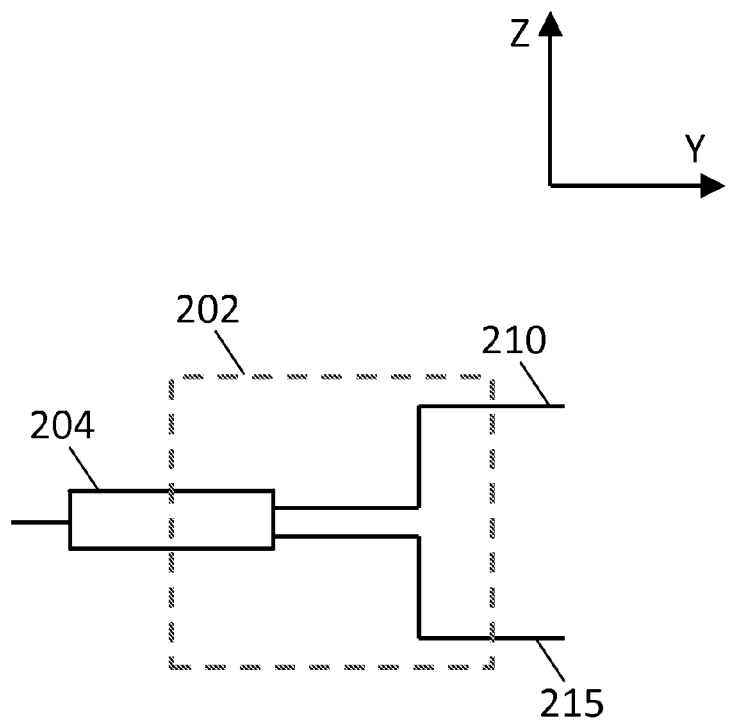

In various embodiments of the optical source, portions of the optical splitter 204 and the waveguides 210 and 215 can include gain material to further reduce a size of the optical source 101 and/or reduce the lengths of the passive sections of the optical source 101 to further increase the optical power and/or SNR of the output optical signal. FIG. 4A-4C schematically illustrate embodiments including an optical splitter that at least partially includes gain material. In the embodiment illustrated in FIG. 4A, the region 405 comprising the optical splitter 204 and portions of the output waveguides 210 and 215 includes gain material such that the region 405 forms an active region in addition to the active region 202. The region 405 can generate photons when an electric field is applied to one or more electrodes contacting the region 405.

In the embodiment illustrated in FIG. 4B, region 410 comprising a portion of the optical splitter 204 proximal to the waveguides 210 and 215 includes gain material such that the region 410 forms an active region in addition to the active region 202. The region 410 can generate photons when an electric field is applied to one or more electrodes contacting the region 410.

In the embodiment illustrated in FIG. 4C, the active region 202 is integrated with the optical splitter 204 and portions of the waveguides 210 and 215. As discussed above, the region 202 can generate photons when an electric field is applied to one or more electrodes contacting the region 202. In various implementations, the entire optical splitter 204 includes the active region 202. In various implementations, only a portion of the optical splitter 204 includes the active region 202.

Figure 5:
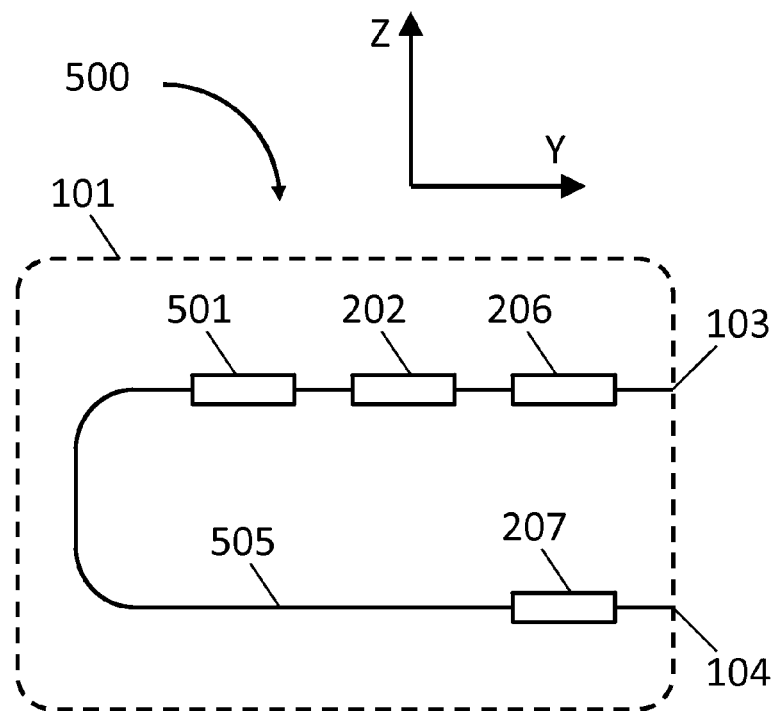
FIG. 5 schematically illustrates a third embodiment of an optical source including two output optical paths. A first output optical path includes a first end of a waveguide and a first reflector. A second output optical path includes a second end of the waveguide and a second reflector.

FIG. 5 schematically illustrates a third embodiment of an optical source 500 including two output optical paths 103 and 104. In contrast to the embodiments illustrated in FIGS. 2 and 3, the optical source 500 includes a single waveguide 505. The first optical path 103 includes a first end of the waveguide 505 and the second optical path 104 includes a second end of the waveguide 505. The first reflector 206 is disposed towards the first end of the waveguide 505 and the second reflector 207 is disposed towards the second end of the waveguide 505. The active region 202 is disposed between the first reflector 206 and the second reflector 207. A phase tuning section 501 similar to the phase tuning sections 203, 205 and 208 can be disposed in the waveguide 505 to adjust the phase of the light generated by the active region 202.

In the illustrated implementation 500, light generated in the active region 202 is emitted via two output interfaces that are disposed on the same side of the active region 202. The waveguide 505 includes one or more curved sections (e.g., bends) such that the two ends of the waveguide 505 are on the same side of the active region 202. In some implementations, instead of one or more curved sections, the waveguide 505 can include TIR mirrors similar to the TIR mirrors is described in U.S. application Ser. No. 12/789,344 which is incorporated by reference herein in its entirety. The embodiment illustrated in FIG. 5 includes a single laser resonator but emits two light beams. The first light beam is emitted through the first end of the waveguide 505 and the second light beam is emitted through the second end of the waveguide 505. The first and the second light beams can have substantially the same wavelength but can be correlated or uncorrelated in optical phase. The embodiment illustrated in FIG. 5 can have an overall smaller footprint as compared to the embodiment illustrated in FIGS. 2 and 3. Moreover, since the embodiment illustrated in FIG. 5 does not include the optical splitter 204, the light generated by the optical source 500 can have higher optical power and/or SNR as compared to the light generated by the optical sources 200 and 300. Furthermore, the optical source 500 can be easier to manufacture as compared to the embodiments illustrated in FIGS. 2 and 3.

The active regions 202, 301 and 302 can comprise active semiconductor material that is capable of generating photons in response to an applied electric field. The reflectors 206 and 207 can be partial reflectors. In various embodiments, the reflectors 206 and 207 can comprise grating structures (e.g., Bragg grating). The mirrors in some embodiments of an optical source including a single output optical path can have a reflectivity of greater than 80% for optimal performance. In contrast, the reflectors 206 and 207 of the various implementations of the optical source 101 discussed above can have a reflectivity between about 4% and about 70%. Accordingly, the reflectors 206 and 207 can have a length that is about 25% to about 65% shorter than a length of a reflector of an optical source with a single output optical path including reflectors with reflectivity greater than 80%. This can be advantageous in reducing the optical loss incurred at each reflection from the reflectors 206 and 207 thereby increasing the optical power of the light generated by the optical source 101. Furthermore, reducing the optical loss incurred at each reflection from the reflectors 206 and 207 can increase the Q of the laser resonator including the active region 202 and/or the first and second active regions 301 and 302. This can be advantageous in generating a light output that is (i) substantially single mode with a side-mode suppression between about 40 dB and about 100 dB; and (ii) has a spectral line width between about 1 kHz and 100 MHz such that the output light has low phase noise. Additionally, decreasing the length of the reflectors 206 and 207 can advantageously reduce the length of the laser resonator including the active region 202 and/or the first and second active regions 301 and 302 which in turn can increase mode spacing. Increasing mode spacing can advantageously increase the side mode suppression ratio and reduce mode hopping. Furthermore, due to their reduced length, reflectors 206 and 207 can be driven with lower electrical power as compared to reflectors in an optical source with a single output optical path including reflectors with reflectivity greater than 80%. Accordingly, the electrical power consumption of the optical source 101 including reflectors with shorter lengths is lower as compared to an optical source with a single output optical path including reflectors with reflectivity greater than 80%.

In various implementations, the reflector 201 can be a Bragg grating mirror, a cleaved facet with optional high reflectivity coating, an etched slot mirror, or any other type of reflector. The reflector 201 can be configured to be broadband such that it provides uniform reflectivity in a range of wavelengths between about 750 nm to about 1.8 µm.

The various implementations of the optical source 101 discussed above can be configured such that an optical power of the generated light is between about 0.1 mW to about 500 mW. In various embodiments, the wavelength λ of the generated light can be in the range between about 1.0 µm and about 1.8 µm. In various embodiments, the wavelength λ of the generated light can be tuned over a wide wavelength range from between about 15 nm to about 100 nm by applying an electrical voltage or current to the phase tuning section 203, 205, 208 and 501 and/or the reflectors 206, 207 and 201. Without subscribing to any particular theory, in various embodiments, the optical source 101 can have a relative wavelength change (Δλ/λ) that is larger than the available relative index tuning (Δn/n) inside the laser resonator, wherein Δλ represents the change in the wavelength of the generated light, n represents the refractive index of the phase tuning section, and Δn represents the change in the refractive index of the phase tuning section. The optical source 101 can be configured to tune to any transmission wavelength in a given range, wherein the range may be larger than the range that can be achieved by refractive index tuning of the semiconductor material and/or the phase tuning section alone. Without subscribing to any particular theory, the wide wavelength tuning in some embodiments of the optical source 101 can be achieved by using the Vernier effect, in which the reflectors defining the laser resonator have multiple reflection peaks. The lasing wavelength is then defined by the overlap between one reflection peak of each mirror. Tuning the index in one of the reflectors or the tuning section (e.g. by applying a voltage or current to electrodes disposed on the mirrors and/or the phase tuning section) can shift the wavelength of each of the many reflections, causing a different pair of reflection peaks to come into alignment, thus shifting the lasing wavelength further than that of the wavelength shift of the tuned mirror.

In various embodiments, the optical source 101 can have a tuning range from about 15 nm to about 100 nm around 1550 nm. In some embodiments, the laser resonator 102 can have a tuning range that is greater than approximately 15 nm. In certain embodiments, the tuning range may be approximately 40 nm to 100 nm. In some embodiments, the tuning range may be at least approximately 20 nm, approximately 25 nm, approximately 30 nm, approximately 35 nm, approximately 40 nm, approximately 45 nm, approximately 50 nm, approximately 55 nm, approximately 60 nm, approximately 65 nm, approximately 70 nm, approximately 75 nm, approximately 80 nm, approximately 85 nm, approximately 90 nm, or approximately 95 nm but less than 100 nm in some embodiments. In certain embodiments, the tuning range may have a value between any of the values provided above. In some embodiments, the tuning range may be less than approximately 15 nm or greater than approximately 100 nm.

As discussed above in various embodiments, the gain medium (e.g., active regions 202, 301 and 302) can be formed on the common substrate and/or in one or more epitaxial layers formed on the common substrate. In various embodiments, the one or more epitaxial layers can include layers or stacks of layers grown, deposited or formed on the common substrate such that the one or more layers have a lattice structure and orientation substantially similar to the common substrate. In various embodiments, the generated light can be emitted from the active region 202 and/or the first and second active regions 301 and 302 along an optical axis. For example, in some embodiments, the optical axis of the gain medium can be aligned parallel to the crystallographic axis of the common semiconductor substrate. In the embodiments illustrated in FIGS. 1-6, the optical axis is aligned parallel to the +y axis.

Integrated Optical Transmitter Including an Optical Vector Modulator

Figure 6:
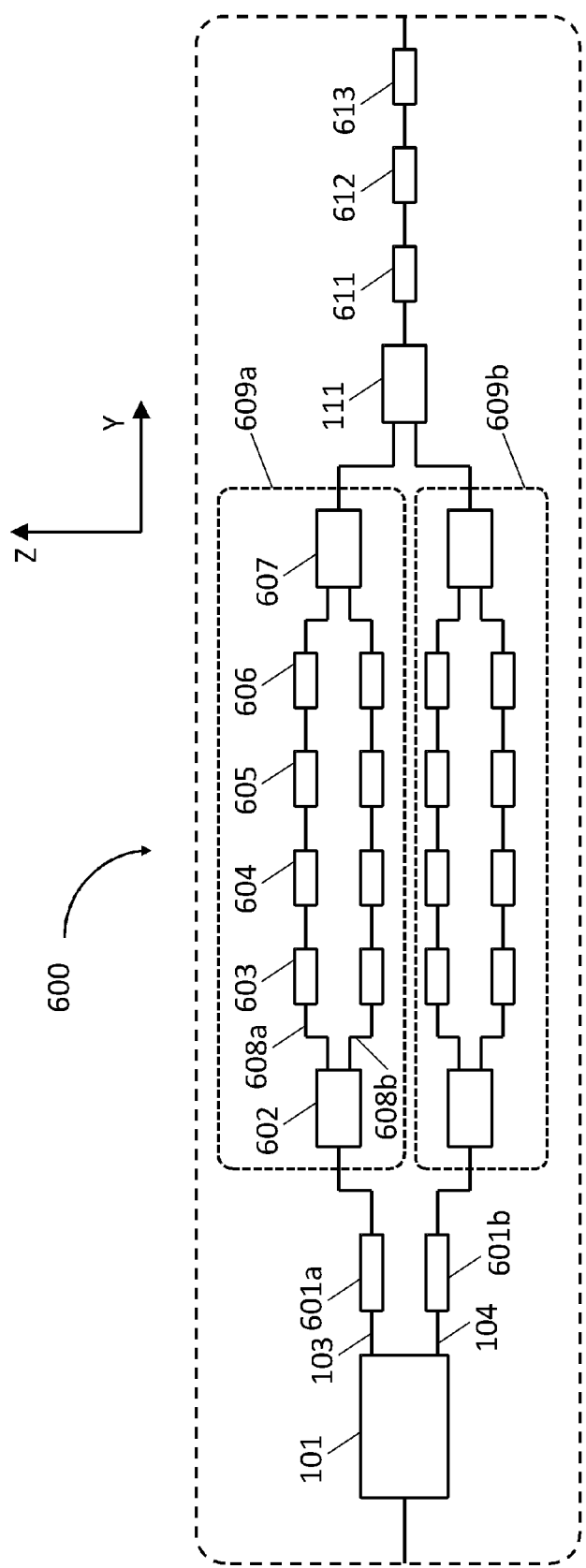
FIG. 6 schematically illustrates an integrated interferometric optical transmitter comprising an optical source configured to emit a first light beam along a first optical path and a second light beam along a second optical path. The optical source is integrated with an optical signal combiner. An optical vector is disposed between the optical source and the optical signal combiner.

FIG. 6 schematically illustrates an integrated interferometric optical transmitter comprising an optical source configured to emit a first light beam along a first optical path and a second light beam along a second optical path. The optical source is integrated with an optical signal combiner. An optical vector (e.g., a dual nested Mach-Zehnder modulator) is disposed between the optical source and the optical signal combiner. Without subscribing to any particular theory, a vector optical modulator can include an optical modulator capable of modulating both optical intensity and optical phase of an input optical radiation to generate optical vector modulation. Examples of optical vector modulation formats include but are not limited to QPSK modulation and multi-level QAM modulation. Various embodiments of integrated optical transmitter including optical vector modulators are also described in U.S. application Ser. No. 12/789,350 which is incorporated by reference herein in its entirety.

The integrated optical transmitter 600 is capable of generating an optical signal, where both the output signal amplitude and phase of the light generated by the optical source 101 can be changed. In the illustrated embodiment, optical vector modulators 609a and 609b are disposed in the dual output optical paths 103 and 105 between the optical source 101 and the signal combiner 111. In various implementations, the optical vector modulators 609a and 609b can be a nested Mach-Zehnder modulator structure. Without any loss of generality, the optical vector modulator 609a can be similar to the optical vector modulator 609b. In various implementations, the dual optical paths 103 and 105 can be connected to the optical vector modulators 609a and 609b via optional optical amplifier sections 601a and 601b. Each optical vector modulator (e.g., 609a) includes an optical splitter 602 that is configured to split an input signal is split in two parts. The optical splitter 602 includes an input waveguide and two output waveguides 608a and 608b. Each of the output waveguides 608a and 608b can be connected to an optional optical amplifier section (e.g., optical amplifier 603). In various implementations, the one or both of the output waveguides 608a and 608b can include optional optical phase tuning section (e.g., phase tuning section 604), an optional modulator electrode (e.g., modulator electrodes 605 and 606) that can provide high speed (e.g., at frequencies up to 40 GHz) phase and/or amplitude modulation. Each vector modulator 609a can include an optical signal combiner 607 that is configured to interferometrically combine optical signal propagating through the two output waveguides 608a and 608b.

The signal combiner 111 is configured to interferometrically combine the optical signals output from the two optical vector modulators 609a and 609b. Thus, the two vector modulators 609a and 609b are configured structurally and functionally as a Mach-Zehnder modulator. An optional modulator electrode 611 and an optional optical amplifier section 612 can be integrated with the output waveguide of the signal combiner 111 for controlling the phase and/or amplitude of the output modulated signal. In various implementations, a mode-converter 613 can be integrated with the output waveguide of the combiner 111 to efficiently couple the modulated signal output to an optical fiber or any other optical signal transmission medium. It is understood that the integrated optical transmitter 600 is only one of several possible embodiments of an optical transmitter including optical vector modulators. For example, in other implementations, the output optical combiner 607 and the combiner 111 can be replaced by a single 4×1 or 4×N optical combiner. Other variations are possible.

The sub-components of optical integrated transmitter 600 (e.g., optical source 101, the vector modulators 609a and 609b, the combiner 111, etc.) can be fabricated on a common substrate including one or more epitaxial layers as discussed above.

Various embodiments of the optical signal combiners (e.g., signal combiner 111, 607, etc.) discussed above can include without limitation a multimode interference (MMI) coupler. Various embodiments of the optical combiners discussed herein can comprise at least two input waveguides and at least one output waveguide configured such that optical radiation propagating through the at least two input waveguides is interferometrically combined and output through the at least one output waveguide. In general, for efficient operation of the optical source 101, it may be desirable to mitigate light reflection from the optical signal combiners. Accordingly, the optical signal combiners can comprise N inputs and M outputs that can allow for light evacuation (e.g. by absorption in the substrate). In various embodiments, the number of inputs N can be 2, 4, etc. while the number of outputs M can be 2, 3, etc. As discussed above, in various embodiments, the combiners can split the light either equally or unequally from the at least two input waveguides. In some embodiments, the optical power combining ratio between the at least two input waveguides can be tunable.

In the embodiments of the integrated optical transmitter described herein, relative pi phase shift for normally OFF operation can be accomplished by implementing the waveguides and the optical signal combiner of the modulating section differently. This could be accomplished for example, by varying the relative lengths of the two output waveguides or by varying the refractive index difference between the two output waveguides.

Various embodiments of the integrated optical transmitter including an optical source with dual output optical paths can be used to generate an ON-OFF keyed modulated signal by introducing a phase difference of either 0-degrees or 180-degrees between the optical signals propagating in the dual output optical paths such that an amplitude modulated signal is produced at the output of the signal combiner.

Various embodiments of the integrated optical transmitter including an optical source with dual output optical paths can be used to generate a QPSK modulated signal. To generate a QPSK modulated signal, each output optical path from the optical source is connected to a vector modulator. The vector modulators can be used to encode in-phase and in quadrature signals. The output of each vector modulator can be interferometrically combined to produce a QPSK modulated signal corresponding to four levels of phase (45, 135, 225, and 315 degrees) and constant amplitude.

In addition to various modulation schemes, networks can also benefit from an optical source that is tunable over a wide wavelength range. For example, using fixed wavelength light emitting devices can increase the operating expense cost due to the need to maintain an inventory of lasers as spare parts. A tunable optical source can allow for a reduction in the number of spare parts required. Other advantages of inclusion of a tunable optical source are more compact size, faster tuning mechanisms, and the lack of moving parts—which can be desirable for applications subject to shock or vibration or temperature variation.

Integration of the full transmitter on a single chip offers several advantages relative to the discrete embodiment. Some of the advantages include precise phase control due to monolithic integration; improved performance and stability of the transmitter; reduced footprint. Additionally monolithic, common substrate integration can reduce insertion losses in the device. Other advantages include ability to adjust or improve the device performance with ageing by having both active and passive sections integrated within the transmitter; ability to adjust the operating conditions of the device for different wavelengths; ability to utilize feedback from on-chip integrated monitor ports in order to better control the operating conditions of the transmitter.

As discussed herein, the term monolithic refers to placing different device components on a common substrate (e.g., a substrate comprising a semiconducting material, an insulating material or a dielectric material), either through epitaxial growth and processing, or through other techniques such as bonding, deposition, fusion etc.

As used herein, the terms "about" or "approximately", when used in reference to an electrical voltage, mean within plus or minus 0.5 V of the referenced electrical voltage. As used herein, the terms "about" or "approximately", when used in reference to an electrical current, mean within plus or minus 100 mA of the referenced electrical current. As used herein, the terms "about" or "approximately", when used in reference to a percentage (%), mean within plus or minus ten percent (±10%). As used herein, the terms "about" or "approximately", when used in reference to a wavelength, mean within plus or minus 1 nm of the referenced wavelength. As used herein, the terms "about" or "approximately", when used in reference to a frequency, mean within plus or minus 10% of the referenced frequency. As used herein, the terms "about" or "approximately", when used in reference to a linear dimension (e.g., length, width, thickness, distance, etc.) mean within plus or minus one percent (10%) of the value of the referenced linear dimension. As used herein, the terms "about" or "approximately", mean within plus or minus 10% of the referenced parameter.

In various embodiments, total internal reflection (TIR) mirrors can also be formed on the substrate. Various embodiments of a TIR mirror can comprise a high index-contrast air-semiconductor interface that allows discrete reflection of the optical mode between two waveguides. One purpose of these structures can be to reflect the waveguide optical mode at an angle. In some embodiments, the TIR mirror can be used to reflect the waveguide optical mode by approximately 90 degrees. Consecutive reflection by two TIR mirrors can allow a 180 degree change in propagation direction of the optical mode. This can allow more compact optical transmitter layouts in which the lengths of optical waveguides can be shortened to reduce optical propagation losses. In some embodiments, deeply etched waveguide bend can also be used instead of TIR mirrors. Embodiments of devices including TIR mirrors is described in U.S. application Ser. No. 12/789,344 which is incorporated by reference herein in its entirety.

While the foregoing detailed description discloses several embodiments of the present invention, it should be understood that this disclosure is illustrative only and is not limiting of the present invention. It should be appreciated that the specific configurations and operations disclosed can differ from those described above, and that the apparatus and methods described herein can be used in contexts. Additionally, components can be added, removed, and/or rearranged. Additionally, processing steps may be added, removed, or reordered. A wide variety of designs and approaches are possible.

The examples described above are merely exemplary and those skilled in the art may now make numerous uses of, and departures from, the above-described examples without departing from the inventive concepts disclosed herein. Various modifications to these examples may be readily apparent to those skilled in the art, and the generic principles defined herein may be applied to other examples, without departing from the spirit or scope of the novel aspects described herein. Thus, the scope of the disclosure is not intended to be limited to the examples shown herein but is to be accorded the widest scope consistent with the principles and novel features disclosed herein. The word "exemplary" is used exclusively herein to mean "serving as an example, instance, or illustration." Any example described herein as "exemplary" is not necessarily to be construed as preferred or advantageous over other examples.

What is claimed is:

1. An optical transmitter comprising:
   a substrate;
   an optical source disposed over the substrate, the optical source comprising:
      a first resonating cavity including a first reflector and a third reflector, the first resonating cavity configured to output a first light beam having a wavelength $\lambda_1$ and a first optical phase along a first output optical path;
      a second resonating cavity including the third reflector and a second reflector, the second resonating cavity configured to output a second light beam having a wavelength $\lambda_2$ and a second optical phase along a second output optical path; and
      a first active region comprising an active material, the first active region coupled to at least one of the first and second resonating cavities,
   at least one modulating electrode integrated with at least one of the first and second output optical paths; and
   an optical signal combiner that interferometrically combines equally or unequally light propagating in the first and second output optical paths to generate an output optical signal.

2. The optical transmitter of claim 1, wherein the wavelength of the first light beam is equal to the wavelength of the second light beam.

3. The optical transmitter of claim 1, wherein the wavelength of the first light beam is within 10% of the wavelength of the second light beam.

4. The optical transmitter of claim 1, wherein the first optical phase is correlated with the second optical phase.

5. The optical transmitter of claim 1, wherein the first optical phase is uncorrelated with the second optical phase.

6. The optical transmitter of claim 1, wherein the first output optical path includes a first waveguide structure and the second output optical path includes a second waveguide structure.

7. The optical transmitter of claim 6, wherein the first active region is formed on an epitaxial layer of the substrate and the first and second waveguides are formed on the substrate in the same epitaxial layer as the first active region.

8. The optical transmitter of claim 6, wherein the first active region is formed on an epitaxial layer of the substrate and the first and second waveguides are formed on the substrate in a different layer.

9. The optical transmitter of claim 1, wherein the first output optical path includes a first end of a waveguide structure and the second output optical path includes a second end of the waveguide structure.

10. The optical transmitter of claim 9, wherein the first active region is formed on an epitaxial layer of the substrate and the waveguide structure is formed on the substrate in the same epitaxial layer as the first active region.

11. The optical transmitter of claim 9, wherein the first active region is formed on an epitaxial layer of the substrate and the waveguide structure is formed on the substrate in a different layer.

12. The optical transmitter of claim 1, wherein the third reflector is disposed such that the first active region is between the first reflector and the third reflector.

13. The optical transmitter of claim 1, wherein the optical source includes an optical splitter and the first and second output optical paths are a part of the optical splitter.

14. The optical transmitter of claim 13, wherein the first active region comprises the optical splitter.

15. The optical transmitter of claim 13, wherein the optical source further comprises a second active region, the first output optical path being coupled to the first active region and the second output optical path being coupled to the second active region.

16. The optical transmitter of claim 15, wherein the first active region is disposed in the first output optical path between the optical splitter and the first reflector and the second active region is disposed in the second output optical path between the optical splitter and the second reflector.

17. The optical transmitter of claim 1, wherein the first and the second light beams are single mode.

18. The optical transmitter of claim 1, wherein the first wavelength or the second wavelength is in a range between 1500 nm and 1600 nm.

19. The optical transmitter of claim 1, wherein the output optical signal has an optical power between about 0.1 mW and about 500 mW.

20. The optical transmitter of claim 1, wherein the first or the second light beam has a spectral line-width between about 1 kHz and about 100 MHz.

21. The optical transmitter of claim 1, wherein at least one of the first reflector or the second reflector has a reflectivity between about 4% and about 70%.

22. The optical transmitter of claim 1, wherein the first reflector or the second reflector comprises a grating.

23. The optical transmitter of claim 22, wherein the first reflector or the second reflector comprises a sampled grating.

24. The optical transmitter of claim 1, wherein at least one the first and the second output optical paths is straight.

25. The optical transmitter of claim 1, wherein at least one of the first and the second output optical paths is curved.

26. The optical transmitter of claim 1, wherein an amplitude or a phase of at least one of the first and second light beams is modulated in response to an electric field applied to the at least one modulating electrode.

27. The optical transmitter of claim 1, wherein the first active region is disposed between the first and second output optical paths such that the first and second output optical paths are disposed on either side of the first active region and connected to the first active regionby straight or curved sections.

28. The optical transmitter of claim 27, wherein the first active region is connected to the first and second output optical paths by total internal reflection mirrors.

29. The optical transmitter of 1, wherein the optical signal combiner is a multimode interference coupler.

* * * * *